April 5, 1955 R. W. TAGGART 2,705,759

RADIO FREQUENCY NOISE ELIMINATION

Filed Nov. 7, 1952

*INVENTOR.*
ROBERT W. TAGGART

*BY* G. A. O'Brien
F. L. Stygner

United States Patent Office 2,705,759

Patented Apr. 5, 1955

2,705,759

RADIO FREQUENCY NOISE ELIMINATION

Robert W. Taggart, Indianapolis, Ind.

Application November 7, 1952, Serial No. 319,447

9 Claims. (Cl. 307—105)

(Granted under Title 35, U. S. Code (1952), sec. 266)

The invention described herein may be manufactured and used by or for the Government of the United States of America for governmental purposes without the payment of any royalties thereon or therefor.

The present invention relates to a noise limiting circuit. More specifically to a noise limiting circuit having a high impedance to noise frequencies and low resistance to normal operating current frequencies in the grounded side of the circuit. The term "noise" is used in its electrical sense.

Previous attempts to limit noise has consisted in resorting to elaborate shielding and introducing complex filtering circuits on the positive side of the circuit. In general, the prior art attempts at eliminating the effect of noise were characterized by the attempt to provide for the noise frequencies as low as resistance path to ground as possible without materially interfering with the normal functioning of the circuit. For example, the great care to tie shields to ground frequently required soldering of the ground tie connections. These methods were not satisfactory because they were not sufficiently noise free and required too complex a circuit to accomplish the desired result or required so much shielding that access to the mechanism for adjustment and repair was impeded.

The present invention is a noise limiting circuit involving an uncomplicated modification of the normal circuit of a noise producing device to secure a substantially complete elimination of the noise interference in nearby noise sensitive circuits.

This invention has as one of its objects the provision of a simple and effective circuit for preventing noise produced in an electrical device, such as a motor or vibrator, from interfering, either by radiation or conduction, with other nearby noise sensitive devices.

Another object of this invention is to provide for noise elimination without the encumbrance of either elaborate circuits or shielding which inhibit access to the mechanism of the device.

Figure 1:
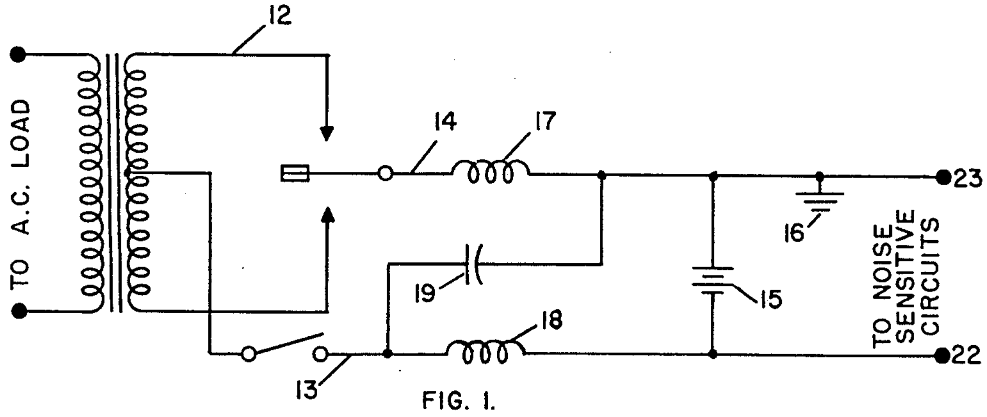
Figure 2:
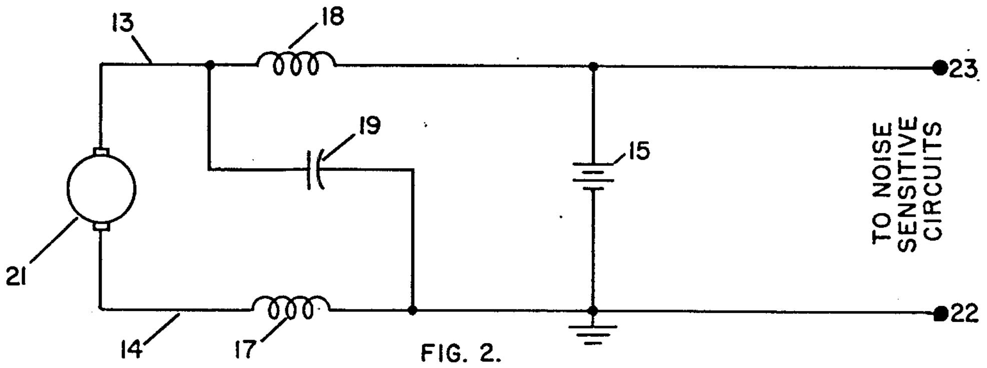
Figure 3:
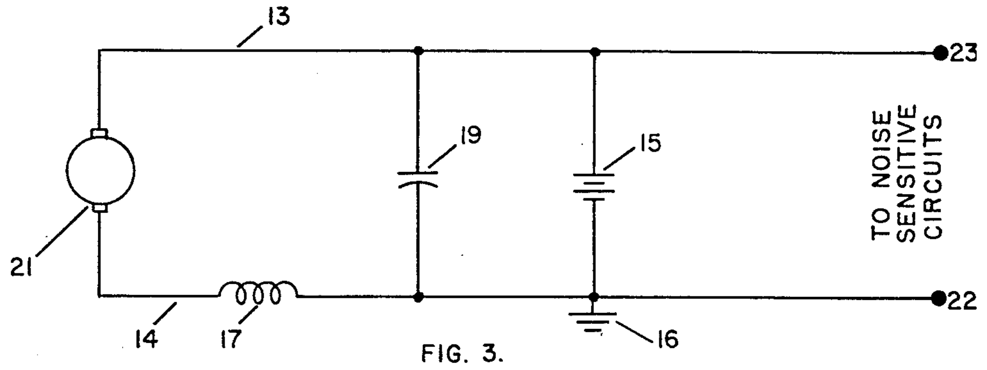

Other objects and many of the attendant advantages of this invention will be readily appreciated as the same becomes better understood by reference to the following detailed description of one embodiment of the invention, when considered in connection with the accompanying drawings wherein:

Fig. 1 is a schematic diagram of the present noise limiting circuit employed with a vibrator, Fig. 2 is a diagram of the noise limiting circuit employed with a motor, and Fig. 3 is a modified noise limiting circuit employed with a motor.

In the embodiment shown in Fig. 1, the power circuit of a vibrator is modified by the present invention. The vibrator exemplified generally at 11, has noise producing contacts 12 and has power input leads 13 and 14 connected to a source of current 15 which as shown is a common source of potential for the noise source and other devices which may be sensitive to noise, and require complete isolation from such disturbing electrical noise sources as the contacts of a vibrator. This sharing of the common source is indicated by terminals 22 and 23 to which such a device could be attached. One side of the circuit is grounded, which in Fig. 1 is the positive side, as shown at 16. Both the power input leads to the vibrator have inserted in series adjacent the vibrator high impedance inductances or high frequency chokes 17 and 18 which have low impedance to direct current or to frequencies below the noise frequencies. According to an important feature of this invention, the capacitor 19 is connected from a point between the vibrator and the inductance 18 in the negative lead 13 to a point in the lead 14 at the grounded side of inductance 17.

In Fig. 2 the noise source is a brush type motor 21 which has inductances 17 and 18 in its power input leads 13 and 14, respectively, the inductances having high impedance to those noise frequencies produced at the brushes but low impedance to the power frequencies of the motor. This inductance is then a high frequency choke. Here, as in Fig. 1, the condenser 19 is connected from a point between the noise source, the motor, and inductance 18 to the grounded side of the inductance 17. Also, as in Fig. 1, the battery 15 is contemplated as a common source of current for the noise producing device and for some noise sensitive circuit to be connected to terminals 22 and 23.

In Fig. 3, the circuit is a modified form of the preferred embodiment of the invention shown in Figures 1 and 2. This modification is accomplished by eliminating the inductance in the ungrounded input lead of the motor, or other noise source. The circuit shown consists then of a motor 21 connected by leads 13 and 14 to a source of power. Lead 14 has in it an inductance having a low impedance to the power frequencies of the motor but a high impedance to the noise frequencies produced by the motor. Terminals 22 and 23 are shown to indicate that the source 15 may be common to both the motor and some noise sensitive circuit.

It has been found that the filter circuit of this invention tends to eliminate both conducted and radiated noise so that the noise limiting circuit is effective in eliminating disturbing noise from nearby sensitive circuits whether or not the noise sensitive circuits are connected to the common power source.

In order to show the operation of the invention, excerpts from tabulated data obtained from an experiment with a motor, such as shown in Figures 2 and 3, is reproduced below. This data was obtained from a noise meter connected across terminals of a voltage source for the motor circuit. The readings are in microvolts at a given frequency. In the test, the circuit of Fig. 2 consisted of a 28 volt direct current motor 17, two inductances 17 and 18, each of 20 microhenries inductances at 1000 cycles and a capacitor of 1 microfared at 200 volts.

*Table I*

| Frequency in Megacycles | Noise without Filter | Noise w/known Pi Filter | Noise with Fig. 3 | Noise with Fig. 2 |
|---|---|---|---|---|
| .6 | 190 | 9 | 6 | 5 |
| 1.0 | 300 | 12 | 2.5 | 1.2 |
| 1.6 | 500 | 80 | 6 | 1.2 |
| 2.0 | 450 | 45 | 9 | .0 |
| 3.6 | 60 | 6.5 | .5 | .0 |
| 6.0 | 100 | 2.5 | .0 | .0 |
| 9.0 | 50 | 9 | 1.0 | .0 |
| 20 | 6 | 3.5 | 4 | .0 |

As can readily be seen from the above table, the circuit of Fig. 2 is the most effective over the range of frequencies shown, while the modification shown in Fig. 3, although not as effective as the circuit of Fig. 2, is more effective than the conventional, so-called "Pi," filter which consists of an inductance in series with one lead of the power input with a condenser by-pass to ground from each end of the inductance.

In order to show the effectiveness of the invention in eliminating radiated noise the following experimental data is given.

The experiment was a measuring of the radiated noise from the leads of a device, which incorporated the present invention, by means of a noise meter inductively connected to the device to test radiated noise which gave the data in microvolts at each given frequency.

*Table II*

| Frequency in Megacycles | Noise w/o Filter | Noise w/Filter |
|---|---|---|
| 1 | 100 | 0 |
| 1.6 | 1,000 | 0 |
| 2 | 1,000 | 0 |
| 3.6 | 25 | 0 |
| 6 | 10 | 0 |
| 9 | 1.5 | 0 |
| 20 | 2 | 0 |
| 30 | 55 | 0 |
| 35 | 18 | 0 |
| 45 | 45 | 0 |
| 50 | 60 | 0 |
| 75 | 35 | 0 |
| 95 | 60 | 0 |

The results indicate the complete elimination of radiated interfering noise.

The following is suggested as a possible explanation of the effect produced by the improved filter circuit.

If an inductive effect is considered as a reflector of the wave energy incident upon it and if such an inductive effect has the property of shifting the phase of the reflected wave by 180 degrees there would be produced a cancellation of the voltage components of the circuit. However, such a cancellation assumes a theoretically pure inductance which is not achieved in practice. Therefore, there would be only a partial cancellation due to the reflection.

To dispose of that energy not canceled there is employed the capacitative effect in the circuit. This effect in the circuit tends to by-pass the uncanceled energy to ground in such a phase relationship that when the wave energy from the ungrounded side of the circuit combines with the wave energy of the grounded side of the circuit there tends to be a further cancellation.

Any residual wave energy is attenuated through ground to a negligible value.

Obviously many modifications and variations of the present invention are possible in the light of the above teachings. It is therefore to be understood that within the scope of the appended claims the invention may be practiced otherwise than as specifically described.

What is claimed is:

1. A noise limiting circuit including a device which produces electrical noise; a source of electrical power to operate said device, said power source having one side grounded; connecting means connecting said power to said device, said means including at least one inductance of high impedance to noise frequencies and low impedance to the normal operating frequencies of the power source connected in series between the grounded side of the power source and the device; a capacitor connected across the connecting means to the grounded side of the inductance.

2. A noise limiting circuit for reducing interference between the noise produced by one device and the operation of nearby noise sensitive devices comprising, a device which produces a noise; a source of power for said device; said power source having one side grounded; leads connecting the power source to the device; a first means having a high impedance to noise frequencies and low impedance to frequencies of the power source connected in series in the lead from the grounded side of the power source to the device; a capacitor connected across the leads to the grounded side of the impedance means.

3. A noise limiting circuit as claimed in claim 1 in which said means includes a second inductance of high impedance to noise frequencies and low impedance to frequencies of the power source is connected in series between the ungrounded side of the power source and the connection to the capacitor.

4. A noise limiting circuit as claimed in claim 2 in which a second means having a high impedance to noise frequencies and a low impedance to frequencies of the power source is connected in series in the lead from the ungrounded side of the source to the device between the power source and the connection to the capacitor.

5. A noise limiting circuit having a noise producing device, a source of power, power conducting means connecting said device to the power source, said means including a pair of leads and a high frequency choke connected in series with each of the leads, a capacitor connected from a point between the device and the first inductance to a point between the second inductance and the grounded side of the source of power.

6. A filter circuit for coupling a source of noise frequencies and noise sensitive devices, said filter comprising a pair of input leads for connecting to a noise source, and a second pair of leads constituting the output of said filter circuit; an inductance connected in series with only one of said input leads and one of said output leads, a ground connected at a point between said inductance and said one of said output leads, a capacitor connected from the other of said input leads to said one of said output leads at the output end of said inductance.

7. A filter circuit for a source of noise frequencies comprising a first pair of leads for connecting to a noise source, inductance means connected in series in said leads, means for grounding one of said leads containing at least a part of said inductance means at the end of said inductance means remote from said noise source, a second pair of leads connected in series with said first pair and constituting output leads for said filter, a capacitor connected across said leads from a point adjacent the noise source to said grounded end of said inductance means.

8. A filter circuit as claimed in claim 7, in which said inductance means includes an inductance connected in series in each of said leads, one of said inductances being said part of the inductance means in the grounded lead and the other of said inductances being connected in series with the other of said leads between the point of contact of said capacitor in said other of said leads and one of said output leads.

9. In combination, in an electrical noise sensitive circuit, a source of random noise frequencies, a noise sensitive device, a two-wire transmission line coupling said source and device, a ground connection to one of the wires of the transmission line to reduce the noise voltage on said one wire as to a fixed stabilized value; an inductance of high impedance to said noise frequencies connected in said one wire between said ground connection and one terminal of said noise source; a capacitance of low impedance to said noise frequencies connected between the other terminal of said noise source and said ground connection.

References Cited in the file of this patent

UNITED STATES PATENTS 1,791,377 Proskauer et al. ---------- Feb. 3, 1931

OTHER REFERENCES

Pub. "Interference"; Wireless World; Feb. 1925; pp. 79 and 80.